US007555575B2

(12) United States Patent
Kaneda

(10) Patent No.: US 7,555,575 B2
(45) Date of Patent: Jun. 30, 2009

(54) METHOD AND APPARATUS FOR MIGRATING DATA BETWEEN STORAGE VOLUMES OF DIFFERENT DATA PATTERN

(75) Inventor: Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 215 days.

(21) Appl. No.: 11/495,321

(22) Filed: Jul. 27, 2006

(65) Prior Publication Data
US 2008/0126673 A1    May 29, 2008

(51) Int. Cl.
*G06F 3/00* (2006.01)
*G06F 13/00* (2006.01)
(52) U.S. Cl. .......................................... 710/33; 711/103
(58) Field of Classification Search ................. 711/103, 711/115; 710/56
See application file for complete search history.

(56) References Cited

U.S. PATENT DOCUMENTS

| | | | | |
|---|---|---|---|---|
| 5,566,348 | A | * | 10/1996 | Dahman et al. ............... 710/18 |
| 5,680,640 | A |   | 10/1997 | Ofek et al. |
| 6,164,787 | A | * | 12/2000 | Seki et al. ....................... 362/1 |
| 6,587,970 | B1 | * | 7/2003 | Wang et al. ..................... 714/47 |
| 2004/0158669 | A1 | * | 8/2004 | Weng et al. ................... 711/103 |
| 2005/0044316 | A1 | * | 2/2005 | Kottomtharayil et al. .... 711/115 |

FOREIGN PATENT DOCUMENTS

WO    WO 97/09676    3/1997

OTHER PUBLICATIONS

Definition of 'random access', 2003, Wiley Publishing, Inc.*
Definition of 'sequential access', 2003, Wiley Publishing, Inc.*
Defintion of 'RAID', 1999, John Wiley & Sons Ltd.*
Jim Gray, 'Why do computers stop and what can be done about it?', Jun. 1985, pp. 1-24.*
Kent Treiber et al., 'Simulation Study of Cached RAID5 designs', 1995, IBM Almaden Research Center.*

* cited by examiner

*Primary Examiner*—Henry W. H. Tsai
*Assistant Examiner*—Hyun Nam
(74) *Attorney, Agent, or Firm*—Sughrue Mion, PLLC

(57) ABSTRACT

The computer system is composed of an old storage apparatus, a new storage apparatus, management computer, data network and management network. Management computer gathers logs at the old storage apparatus. When data is moved from the old storage to the new storage, destination volume in the new storage apparatus is allocated and concatenated using the gathered log information and a mapping table. The system and apparatus simplifies migration processes from ordinary storage apparatus to the new storage device, which may include HDDs and FLASH memory units. The system takes into account the differences in performance characteristics of HDDs and FLASH memories, achieving improver performance of the overall storage system.

35 Claims, 16 Drawing Sheets

Fig. 2

| VOL# | Command | LBA | Block Length | Receive Time | Respond Time |
|---|---|---|---|---|---|
| | | | | | |
| | | | | | |
| | | | | | |
| | | | | | |
| | | | | | |
| | | | | | |
| | | | | | |
| | | | | | |

| Chunk # | Access Pattern | Write Ratio | Access Frequency | No Access Duration/Day |
|---|---|---|---|---|
| 1 | Random | 60% | High | 1 hour |
| 2 | Random | 0% | High | 1 hour |
| 3 | Random | 100% | High | 0 hour |
| 4 | Random | 60% | Low | 1 hour |
| 5 | Sequential | 0% | Mid | 1 hour |
| 6 | Sequential | 100% | Mid | 0 hour |

Fig. 5

| Access Pattern | Write Ratio | Access Frequency | No Access Duration/Day | Chunk Allocation Pool | Priority |
|---|---|---|---|---|---|
| Random | 100~50% | High | More than 10min/day | FLASH | 2 |
| | | | Less than 10min/day | HDD | |
| | | Mid/Low | Don't care | FLASH | 6 |
| | 50%~0% | High | Don't care | FLASH | 1 |
| | | Mid | Don't care | FLASH | 3 |
| | | Low | Don't care | FLASH | 5 |
| Sequential | 100~50% | High | More than 10min/day | FLASH | 4 |
| | | | Less than 10min/day | HDD | |
| | | Mid/Low | Don't care | HDD | |
| | 50%~0% | High/Mid/Low | Don't care | HDD | |

529

METHOD AND APPARATUS FOR MIGRATING DATA BETWEEN STORAGE VOLUMES OF DIFFERENT DATA PATTERN

DESCRIPTION OF THE INVENTION

1. Field of the Invention

This invention is related to data storage technology and more specifically to data migration between storage devices utilizing storage media with different performance characteristics.

2. Description of the Related Art

Today, almost all large capacity data storage devices are designed based on storage controller(s) and HDDs (hard disk drives). The primary reason for widespread use of the HDDs in the storage devices is their lower per bit cost compared to other random accessible storage devices.

As would be appreciated by those of skill in the art, the useful life of storage devices is limited. Generally, the lifetime of a data storage unit is anywhere from 3 years to 5 years. Towards the end of the storage unit's useful life, the data in the storage unit must be migrated to a new storage apparatus. If the data is not migrated to the new storage apparatus, it may be lost. For example, if one wishes to preserve the data for ten years, the data migration must be performed several times.

On the other hand, it is desirable to maintain the high data availability by improving the data access performance characteristics of the new storage apparatus. It is also desirable to try to reduce the data preservation and data management costs. Therefore, the storage administrator may wish to specially design the volume configuration at the new storage apparatus.

A per stored bit cost of FLASH memory units is steadily declining. Therefore, FLASH memory becomes more and more attractive as a storage medium for high capacity storage devices. However, at the present time, the per bit cost of FALSH memory is still higher than the cost of the HDDs. Therefore, some storage devices make use of different performance characteristics of the HDDs and FLASH memory devices. A storage system administrator of aforesaid dual media data storage devices faces a problem how to migrate data stored in the ordinal storage apparatus to new storage apparatus, which is composed of HDDs and FLASH memories. In migrating the data, one must be mindful of the distinct performance characteristics of the FLASH memory's and the HDD.

A U.S. Pat. No. 5,680,640 entitled "System for migrating data by selecting a first or second transfer means based on the status of a data element map initialized to a predetermined state," incorporated herein by reference, discloses techniques for migrating data from an old storage apparatus to a new one by means of a data connection established between the two storage devices. However, the existing data migration techniques do not deal with migrating data to a storage device, which includes both HDD units and FLASH memory units.

Therefore, the existing technology fails to provide means for migrating data from storage apparatuses composed of HDDs to storage apparatus composed of HDDs and FLASH memories. Specifically, the existing technology does not provide means for allocating and concatenating volumes on new storage apparatus according to the organization of the old storage unit, requiring the storage administrator to manually perform this tedious task.

SUMMARY OF THE INVENTION

The inventive methodology is directed to methods and systems that substantially obviate one or more of the above and other problems associated with conventional techniques for data migration in information systems having at least two storage devices.

In accordance with one aspect of the inventive concept, there is provided a computerized storage system comprising a first storage device, which includes a first storage volume storing data; a host computer operatively coupled to the first storage system via a network and configured to access the data in accordance with a data access pattern. The inventive computerized storage system further includes a second storage device coupled to the first storage device, which includes a storage controller, a first media pool and a second media pool. The characteristics of the first media pool are different from the characteristics of the second media pool. The second storage device is configured to determine the data access pattern and to allocate a second storage volume including at least a portion of a first media pool and at least a portion of the second media pool in accordance with the determined data access pattern and to create a copy of the data in the allocated second storage volume.

In accordance with another aspect of the inventive concept, there is provided a method involving logging access requests directed to a data stored in a first storage volume to produce a log information and analyzing the log information to determine a data access pattern. The inventive method further involves allocating a second storage volume, which includes at least a portion of a first media pool and at least a portion of a second media pool in accordance with the determined data access pattern and migrating the data from the first storage volume to the second storage volume.

In accordance with yet another aspect of the inventive concept, there is provided a computer programming product embodied in a computer-readable medium. The inventive computer programming product includes code for logging access requests directed to a data stored in a first storage volume to produce a log information and code for analyzing the log information to determine a data access pattern. The inventive computer programming product further includes code for allocating a second storage volume, which includes at least a portion of a first media pool and at least a portion of a second media pool in accordance with the determined data access pattern and code for migrating the data from the first storage volume to the second storage volume.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2 illustrates an exemplary embodiment of a table 299 for storing access log information.

FIG. 4 illustrates an exemplary embodiment of a table holding results of access log analysis.

FIG. 5 illustrates an exemplary embodiment of a mapping table.

DETAILED DESCRIPTION

Figure 1A:
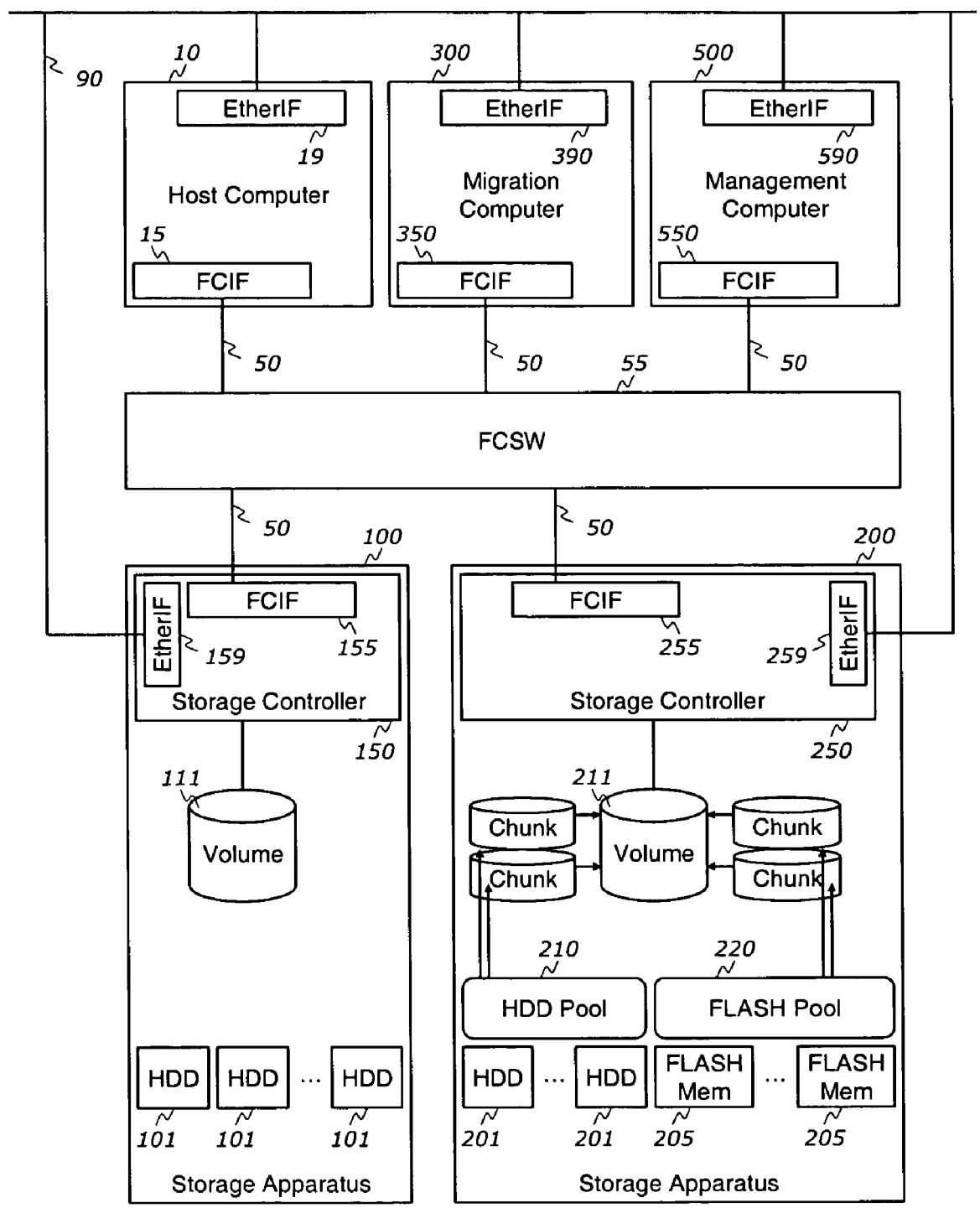
FIGS. 1(a)-(f) show various aspects of an exemplary information storage system in which an embodiment of the inventive concept may be implemented.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software executing on a general purpose computer, in the form of a specialized hardware, or combination of software and hardware.

Latency in a hard disk drive (HDD) is caused by head seek operation and media rotation. Sequential access is characterized by short latency and high throughput. Random access is characterized by long latency and low throughput. Write access time may be the same as the read access time except in the case of "write & verify" operation, which is described in detail below.

Latency in flash memory storage devices is caused by programming time and page-erase time. The read operations carry minimum latency because they do not involve head seek and media rotation. The latency of random read operations is the same as sequential ones. However, the latency of write operations is greater than the latency of read operations. The completion of the flash memory write operation takes longer because the write operation involves media programming, which take time. Also, frequently over-writing data in flash memory units involves both "page-erasing time" and "media programming time". If an erased blank page cannot be found within the FLASH chip, then page erase operation must be performed before data can be written to the storage device. FLASH memory storage unit erases the pages while the chip is in idle mode. Therefore, if the write operations are not performed with high frequency, pages are erased in the FLASH chip automatically without any delay to the write operations. On the other hand, when the writes are frequent, the system may not have enough time to perform the erase operation and the write process may need to be postponed until the completion thereof.

An exemplary system configuration will now be described. FIGS. 1(a)-(e) illustrate various aspects of an exemplary information storage system in which an embodiment of the inventive concept may be implemented. The information system in accordance with the first exemplary embodiment of the inventive concept includes the components described in detail below.

The host computer 10 will now be described. At least one host computer 10 is connected to the storage apparatus 100 via data network 50. Once data is migrated from the old storage apparatus to the new one, the host computer must be re-connected from the old storage device to the new storage apparatus, to enable it to access the migrated data.

The management computer 500 will now be described. At least one management computer 500 is connected via management network 90 to the host computer 10, a migration computer 300 and storage devices 100 and 200.

The storage apparatus 100 will now be described. The inventive system includes at least one storage apparatus 100, which incorporates a storage controller 150 and one or more HDDs 101. The storage apparatus 100 may additionally include storage controller 150, which may provide RAID data protection functionality to the storage apparatus 100. In FIG. 1, the exemplary storage apparatus 100 is shown to have one volume 111 for storing data. The data is written to and read from the volume 111 by the host computer 10.

The storage apparatus 200 will now be described. The information storage system additionally includes at least one storage apparatus 200, which is composed of storage controller 250, one or more HDDs 201 and one or more FLASH memory units 205. The storage apparatus 200 may additionally include a storage controller 250, which may provide RAID data protection functionality to the storage apparatus 200. The embodiment of the storage apparatus 200 shown in FIG. 1 incorporates two storage pools. One storage pool is composed of HDDs (referred to herein as "HDD pool 210"), and the other is composed of FLASH memory units (referred to herein as "FLASH pool 220").

The data network 50 will now be described. Host computer 10 as well as storage devices 100 and 200 are interconnected via data network 50. In one embodiment of the inventive system, the data network 50 is a Fibre Channel network. However, other suitable network interconnects, such as Ethernet and the like can also be used in implementing the data network 50. The data network 50 may include appropriate number of network switches and hubs, which implement the interconnect functionality. In FIG. 1, a fibre channel switch (referred to as FCSW 55) is used for interconnecting the aforesaid storage system components. To this end, the host computer 10, the migration computer 300, the management computer 500, and the storage devices 100 and 200 have one or more fibre channel interface boards (referred as FCIF) for coupling the respective devices to the fibre channel data network 50.

The management network 90 will now be described. The host computer 10, management computer 500, and storage devices 100 and 200 are also interconnected via management network 90. The management network 90 in this embodiment of the inventive concept is Ethernet network. However, other suitable network interconnects can be also used. The network 90 may be implemented using suitable network switches and hubs. The host computer 10, migration computer 300, management computer 500 and the storage apparatus 100 and 200 may have one or more Ethernet interface boards (referred to herein as EtherIF) for connecting the respective devices to the Ethernet management network 90.

The Host Computer 10 will now be described. Host computer 10 includes a Memory 12 for storing programs and data and CPU 11 configured to executing programs stored in the Memory 12. The Host computer 10 additionally includes FCIF 15 for connecting the Host computer 10 to the data network 50 and EtherIF 19 for connecting Host computer 10 to the management network 90.

Figure 1B:
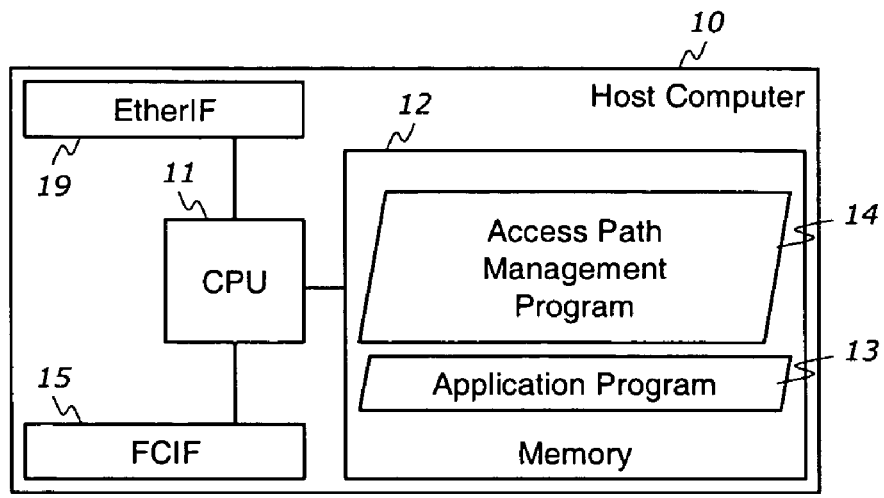
Figure 1C:
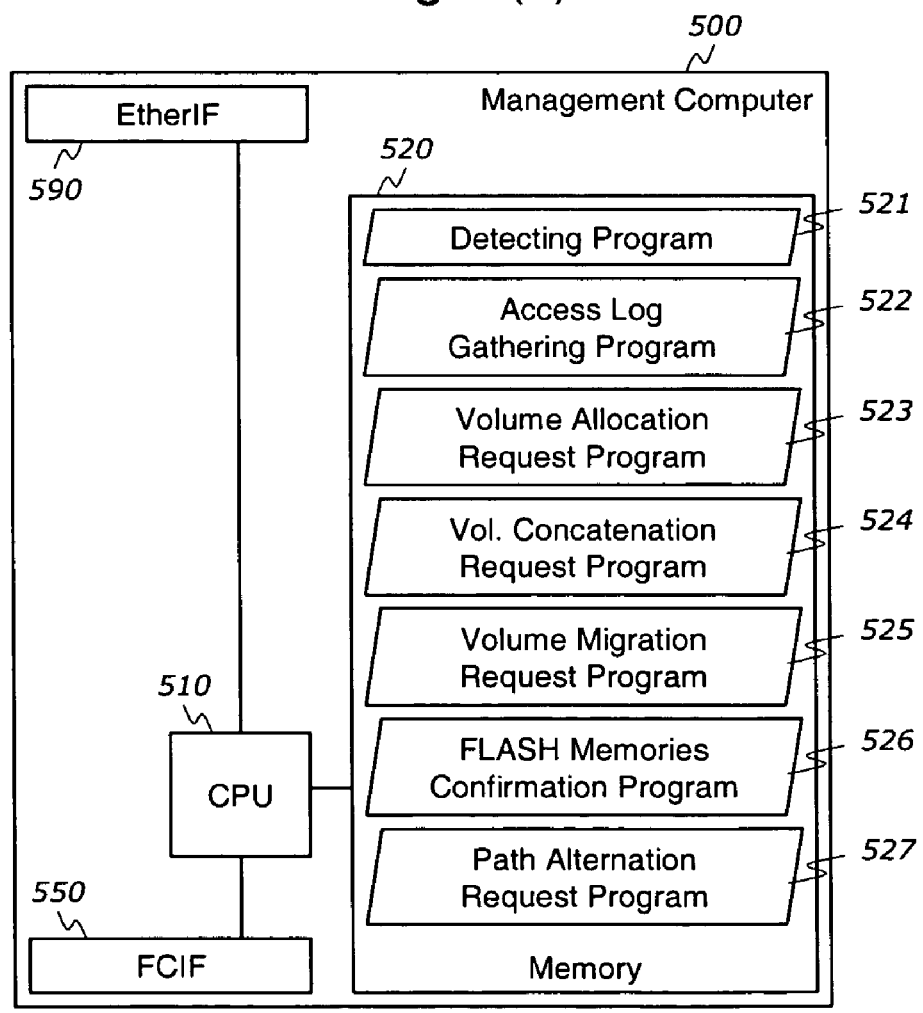

The Host Computer 10 runs at least two programs, which are stored in memory 12 and executed by CPU 11, see FIG. 1(b). In one embodiment of the invention, the memory 12 stores an application program 13 for writing data to the volume and/or reading data from the volume and an access path management program 14 for managing access path between the host computer 10 and the storage devices.

The management Computer 500 will now be described. The management computer 500 includes a memory 520 for storing programs and data and a CPU 510 for executing the programs stored in the memory 520. The management computer 500 additionally includes FCIF 550 for connecting the management computer 500 to the data network 50 and EtherIF 590 for connecting the management computer 500 to the management network 90.

The memory 520 of the management computer 500 stores at least seven programs, which are executed by CPU 510. The stored programs include detecting program 521 for detecting remaining life of the storage apparatus and for discovering new storage units. Also stored is an access log gathering program 522 for gathering logs from storage apparatuses, a volume allocation request program 523 for requesting volume allocation from a target storage apparatus; a volume concatenation request program 524 for requesting volume concatenation from a target storage apparatus or a volume management program on the host computer or the FCSW. Additional programs stored in the memory 520 include a volume migration request program 525 for requesting volume migration to a migration module, a FLASH memory units confirmation program 526 for confirming the existence of FLASH memory unit(s) within the storage device and a path alternation request program 527 for alternating access path from a host computer to a volume.

The storage apparatus 100 will now be described. The storage apparatus 100 includes one or more HDDs 101, a storage controller 150 for maintaining data storage volumes. Each data storage volume is composed of chunk of one or more HDDS. As may be appreciated by those of skill in the art, the aforesaid HDD chunk may store redundant data for improving data reliability. The storage apparatus 100 stores data in one or more volumes 111. The embodiment of the inventive storage apparatus 100 shown in FIG. 1(d) includes one volume 111. However, the inventive concept is not limited to just one such volume.

Figure 1D:
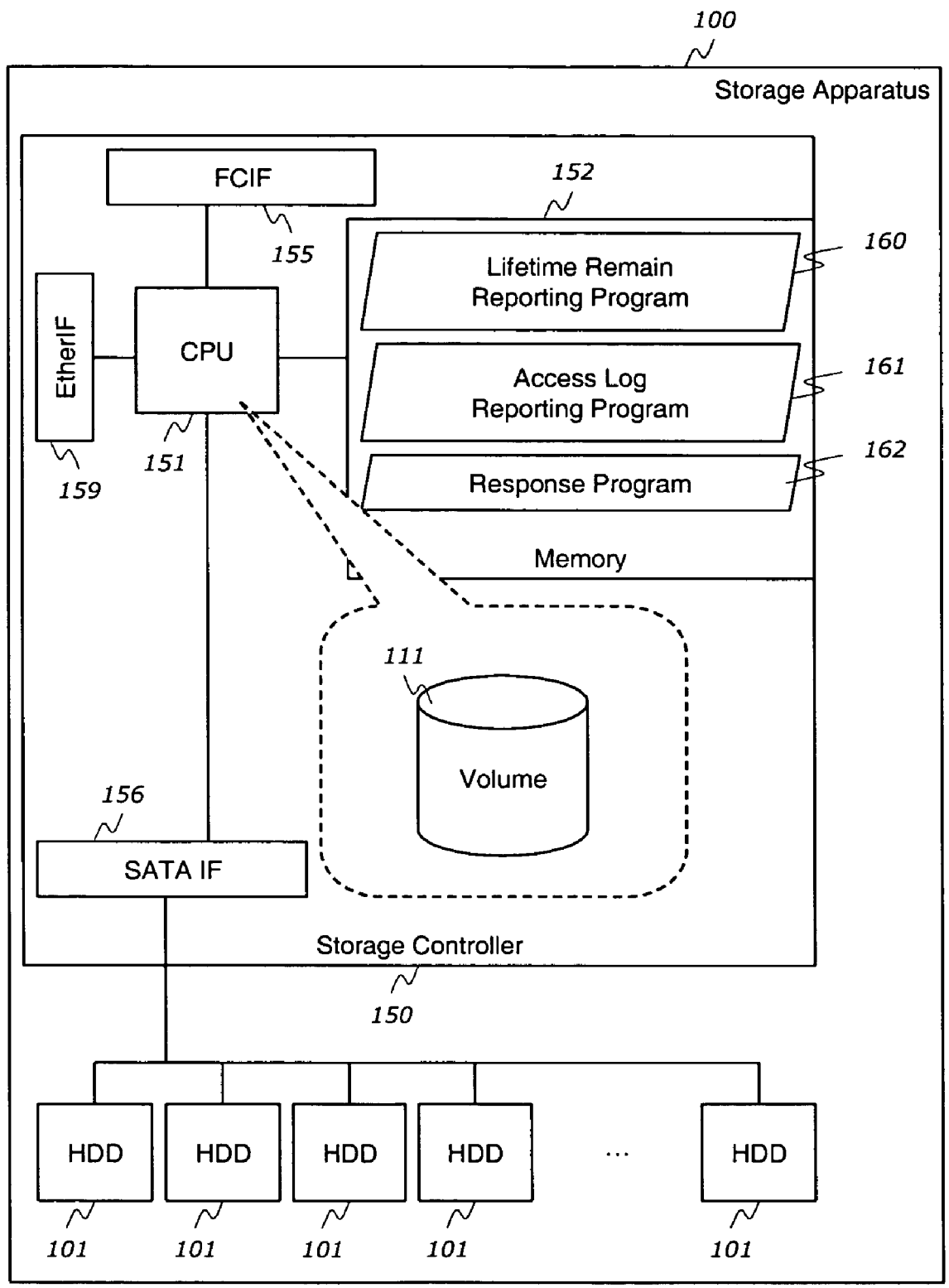
Figure 1E:
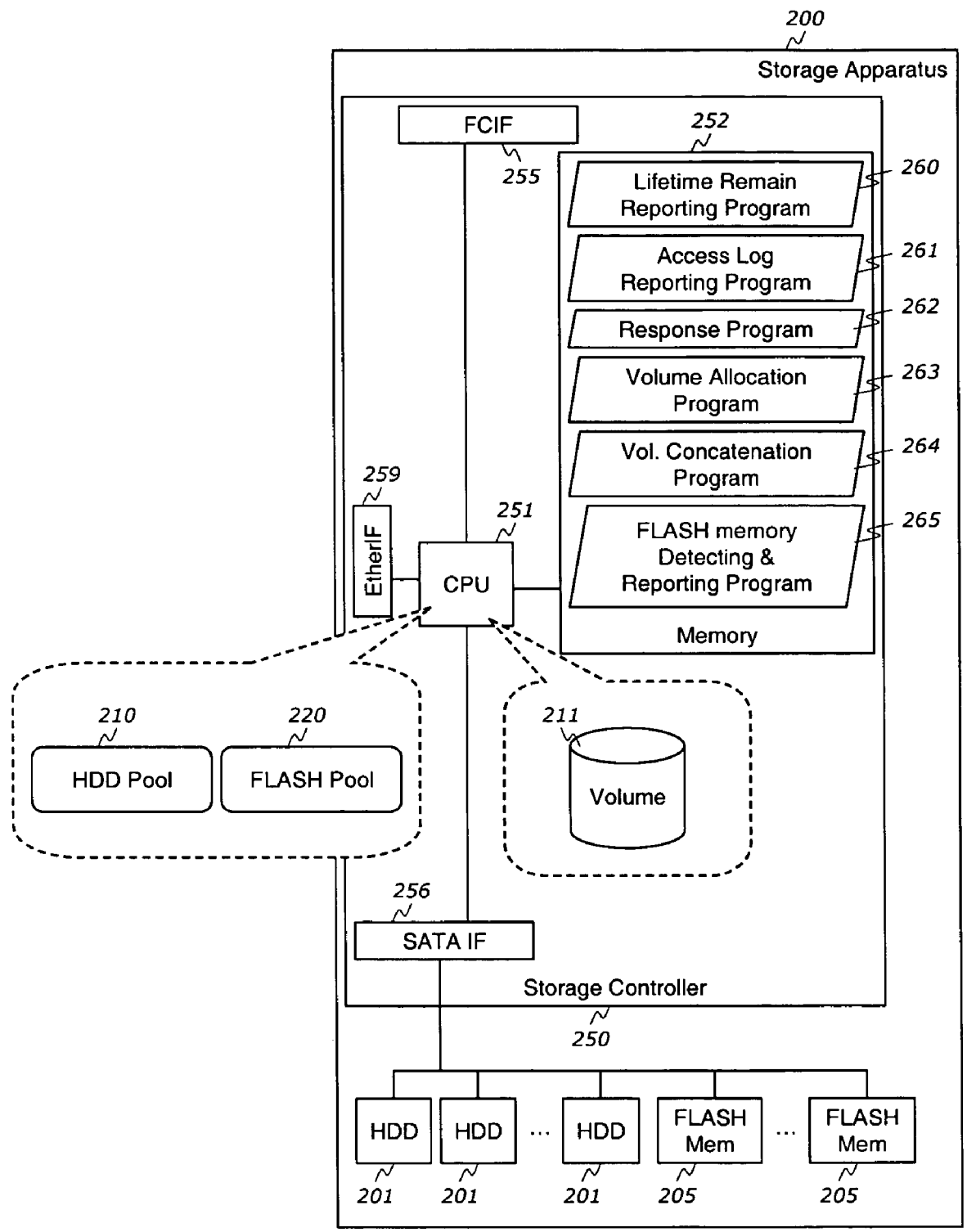
Figure 1F:
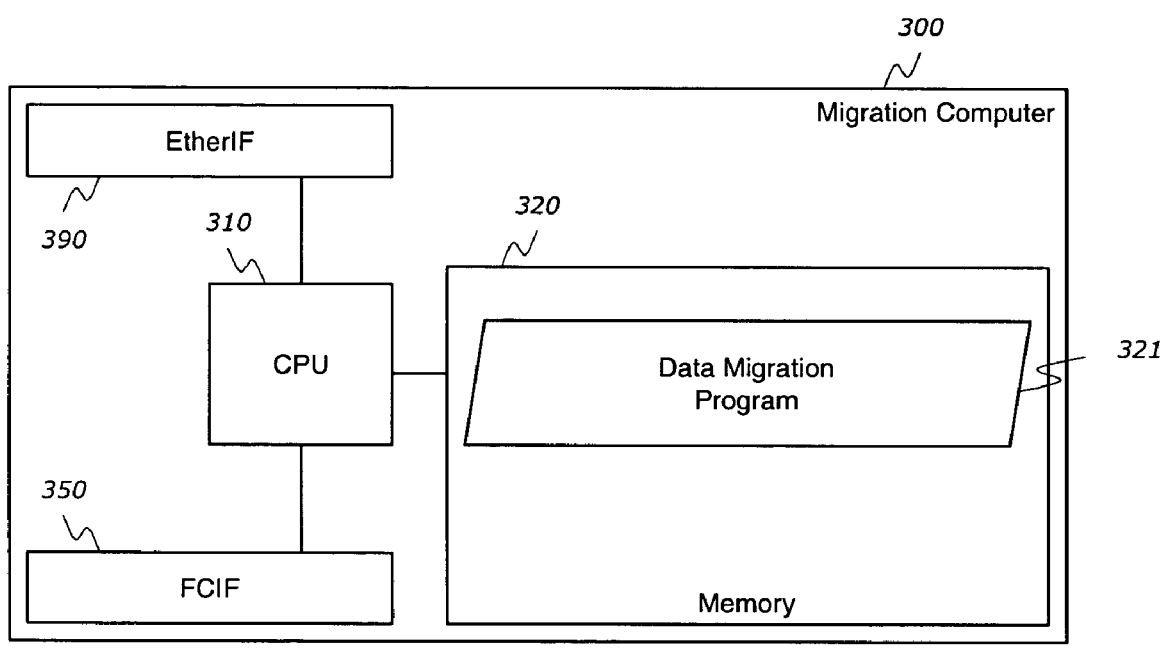

Storage controller 150 includes a CPU 151 for executing programs stored in memory 152, a memory 152 for storing programs and data, a FCIF 155 for connecting to the data network 50, as well as SATA IF 156 for connecting to the HDD 101, see FIG. 1(d). It should be noted that if HDD has another interface such as FC, SCSI, or SAS, the storage controller needs to include an appropriate storage interface that would match the storage interface of the HDD. The storage controller 150 further includes EtherIF 159 for connecting the storage controller 150 to the management network 90.

The memory 152 of the storage apparatus 100 stores at least three programs, which are executed by the CPU 151. In one exemplary embodiment of the inventive storage apparatus 100, shown in FIG. 1(d), the memory 152 stores the remaining lifetime reporting program 160 for reporting remaining lifetime of the storage device, an access log reporting program 161 for reporting access logs associated with the storage device and response program 162 for responding to read/write inquiries or requests from the host computer 10.

Storage apparatus 200 will now be described. The storage apparatus 200 includes one or more HDDs 201 and one or more FLASH memories 205, see FIG. 1(e). The HDDs 201 are grouped into one or more HDD pools 210. The embodiment of the storage system 200 shown in FIG. 1(e) includes only one HDD pool 210. Each HDD pool is composed of one or more HDDs. In addition, the storage apparatus 200 incorporates one or more FLASH pools. The embodiment of the storage apparatus 200 shown in FIG. 1(e) includes only one FLASH pool 220, which is composed of one or more FLASH memory units 205.

The storage apparatus 200 further includes storage controller 250 for maintaining data storage volumes 211. Each such storage volume 211 is composed of a portion of the aforesaid HDD pools and/or FLASH pools. The portions of the HDDs and FLASH memory pools forming the storage volume 211 may store redundant data for improving data reliability.

The storage controller 250 includes a memory 252 for storing programs and data and CPU 251 for executing programs stored in the memory 252. The storage controller 250 further includes FCIF 255 for connecting the storage controller 250 to the data network 50 and SATA IF 256 for connecting the storage controller 250 to the HDD 201 and FLASH memory units 205. If the HDD/FLASH memory units 201 and 205 have other types of interfaces, such as FC, SCSI, SAS, or any FLASH-specific memory interface, the storage controller 250 should include a matching interface.

The storage controller 250 further includes an EtherIF 259 for connecting the storage controller 250 to the management network 90. In the embodiment of the storage controller 250 shown in FIG. 1(e), the memory unit 252 stores at least six programs, which are executed by the CPU 251. Specifically, the memory 252 stores a remaining lifetime reporting program 260 for reporting the remaining lifetime of the storage, an access log reporting program 261 for reporting access log information, a response program 262 for responding to read/write inquiries/requests initiated by the host computer 10.

The memory 252 additionally stores a volume allocation program 263 for allocating volumes within the HDD pools or the FLASH pools, a volume concatenation program 264 for concatenating chunks into one volume, a FLASH memory detecting and reporting program 265 for detecting FLASH memory units in the storage apparatus and reporting the results of the detection operation to the host computer.

The FLASH memory detecting and reporting program 265 will now be described. The FLASH memory detecting and reporting program 265 can detect FLASH memory units within its storage apparatus. In one exemplary embodiment, the FLASH memory units are interchangeable with the HDD units. In this embodiment, the FLASH memory detecting and reporting program 265 invokes an INQUIRY command directed to the FLASH memory units and/or HDD units. If the response to the INQUIRY command includes information indicating the presence of the FLASH memory, such as Vendor ID and Device ID attributable to a FLASH memory unit, then the FLASH memory detecting and reporting program 265 recognizes the presence of the FLASH memory unit in the storage apparatus. As would be appreciated by those of skill in the art, other storage device detecting mechanisms may be also used.

The migration computer 300 will now be described. In the embodiment of the inventive system shown in FIG. 1(f), the migration module is implemented using the migration computer 300 executing a migration program 321. The migration computer 300 is connected to the data network via the FCSW 55. Migration computer 300 includes a memory 320 for storing the programs and data and a CPU 310 for executing the programs stored in the memory 320. The migration computer 300 further includes FCIF 350 for connecting the migration computer 300 to the data network 50 and EtherIF 390 for connecting the migration computer 300 to the management network 90.

The memory 320 stores at least one program, which is executed by CPU 310. In one embodiment of the inventive system, the memory 320 stores a data migration program 321 for migrating data from a storage volume to another storage volume.

The process flow of an exemplary embodiment of the inventive system will now be described. Specifically, in the described embodiment of the inventive system, the storage apparatus 100 incorporates a storage volume 111. The volume 111 is connected to the host computer 10. The host computer 10 is capable of writing data to the volume 111 and reading data from this volume. To this end, the appropriate read and a write requests from host computer 10 are sent to the storage controller 150 via the data network 50. The response program 162 executing within the storage controller 150 receives the aforesaid requests and executes them. The access log reporting program 161 also executing in the storage controller 150 logs a volume number, a command information (read or write), LBA (logical block address) of the data associated with the command, block length of the command, command receipt time, and command response time. FIG. 2 shows an exemplary embodiment of a table for storing the aforesaid log information. Analysis of the information stored in this table yields information on the access pattern of the corresponding data. The access pattern information may indicate whether the data access is random or sequential, the ratio of the read and write operations, as well as access frequency and no access duration.

Figure 3:
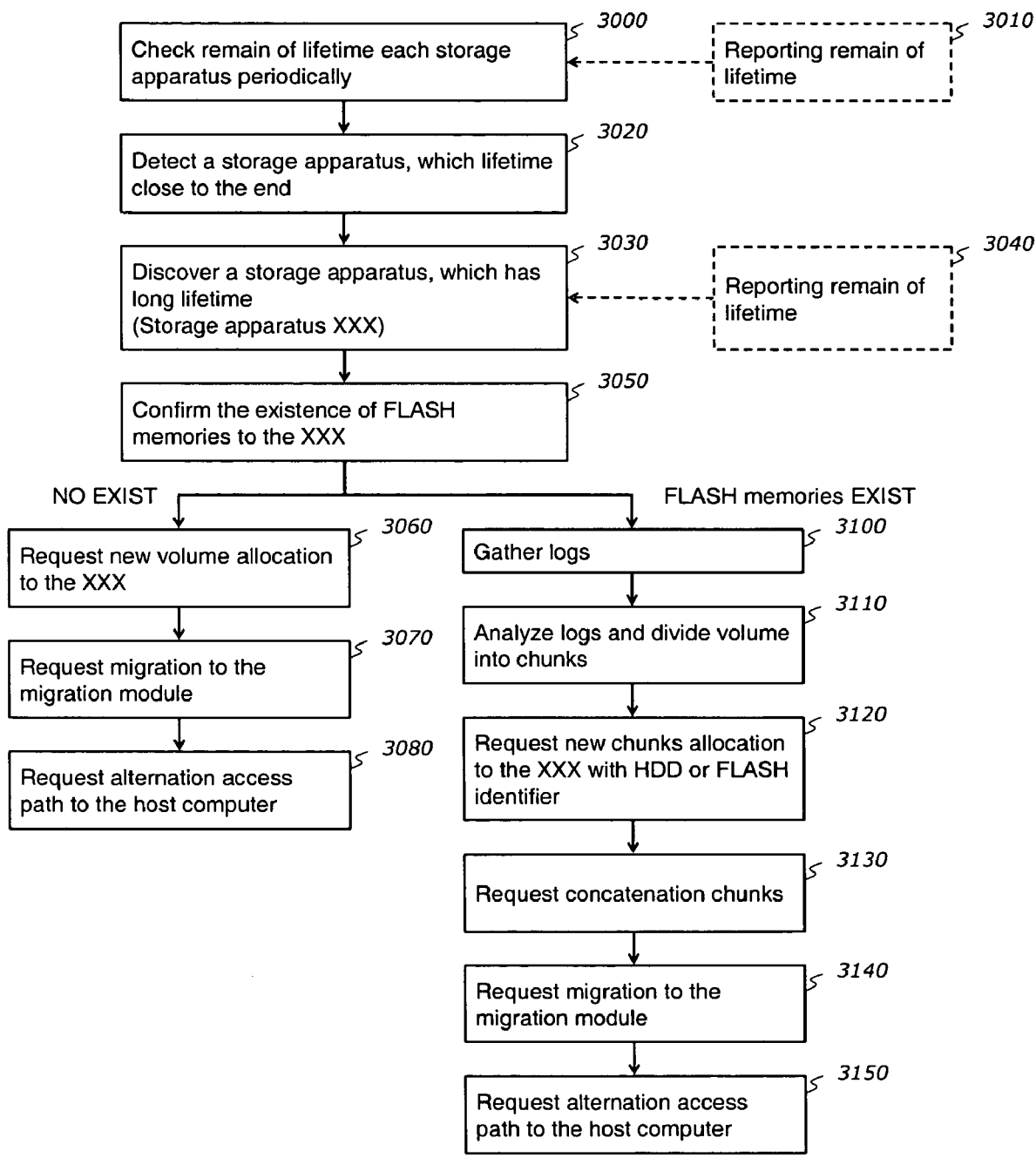
FIG. 3 illustrated an exemplary process flow of the computerized storage system shown in the FIG. 1.

FIG. 3 illustrates an exemplary operating flow of the system shown in the FIG. 1. This operating flow is performed towards the end of the lifetime of the storage device.

STEP 3000: The detecting program 521 periodically polls each storage apparatus and checks its remaining life.

STEP 3010: The remaining lifetime reporting program 160 reports the "remaining lifetime" to the detecting program 521.

STEP 3020: If the detecting program 521 detects a storage apparatus having a lifetime approaching its end, the process continues to step 3030.

STEP 3030: The detecting program 521 locates a storage unit within the computerized storage system, which has a long remaining lifetime.

STEP 3040: The remaining lifetime reporting program 260 reports "remaining lifetime" of the storage unit to the detecting program 521.

STEP 3050: The FLASH memory unit confirmation program 526 determines the presence of FLASH memory units within the discovered storage unit. In the shown embodiment, the discovered storage unit is within the storage apparatus 200. If no FLASH memory units are present, the process continues with step 3060. If FLASH memory units are present, the process proceeds to step 3100.

STEP 3060: The volume allocation request program 524 requests new volume allocation within the discovered storage apparatus. In the shown embodiment of the inventive system, the new volume allocation is requested within the storage apparatus 200 via the management network 90.

STEP 3070: The volume migration request program 525 requests data migration from an old volume with expiring lifetime to a new volume in the discovered storage unit. The data migration request is sent to the volume migration program 321 via the management network 90.

STEP 3080: The path alternation request program 527 requests alternation of the access path from the access path associated with the old volume 111 to the access path associated with the new volume 211. The access path is modified upon the completion of the migration process.

STEP 3100: The access log gathering program 522 collects log information from the access log reporting program 161.

STEP 3110: The volume analysis program 526 analyzes the log information and splits volume area into several portions (chunks) based on the information gathered from the access log analysis. The exact manner in which the volumes are divided into chunks is described hereinbelow.

STEP 3120: The volume allocation request program 524 requests new volume allocation within the discovered storage apparatus for each portion of the volume area. For example, if a volume is divided into six portions, then the volume allocation request is repeated six times. Each chunk is allocated from the HDD pool or the FLASH pool. The allocation of the aforesaid chunk is based on the results of the log analysis. The volume allocation request includes an identifier indicating whether the specific portion of the volume should be allocated on HDD storage media or on FLASH storage media. The manner in which the system determines which storage media pool (HDD or FLASH) is more preferable for specific data is described in detail below.

STEP 3130: The volume concatenation request program 524 concatenates the chunks into one storage volume. The concatenated volume is only accessible from the application program 12 executing on the host computer 10.

STEP 3140: The volume migration request program 525 requests migration of data from a volume within a storage apparatus with expiring lifetime to the volume concatenated at step 3130.

STEP 3150: The path alternation request program 527 requests modification of the data access path to reflect the change of the data storage volume from volume 111 to volume 211.

Now, the manner in which volumes are divided into chunks and the manner for determination of the preferable storage pool will be described in detail. The storage volumes are divided into chunks by the volume analysis program 526. In one exemplary embodiment of the invention, the volume is divided into six chunks and each chunk has the same size. As would be appreciated by those of ordinary skill in the art, the size and number of chunks are not essential to the inventive concept. FIG. 4 illustrates an exemplary embodiment of a table holding results of access log analysis. This table is created by the access log gathering program 522.

The volume analysis program 526 uses a mapping table 529, which is shown as FIG. 5. The mapping table 529 is stored in the memory 520. The volume analysis program 526 compares the characteristics of a specific volume chunk represented by a record in the result-holding table 528 with the appropriate records in the mapping table 529. Based on the results of the aforesaid comparison, the volume analysis program 526 determines whether the specific chunk should be allocated from HDD pool or FLASH pool. Specifically, the "Chunk Allocation Pool" column of the table indicates the type of the preferable storage pool.

Figure 6:
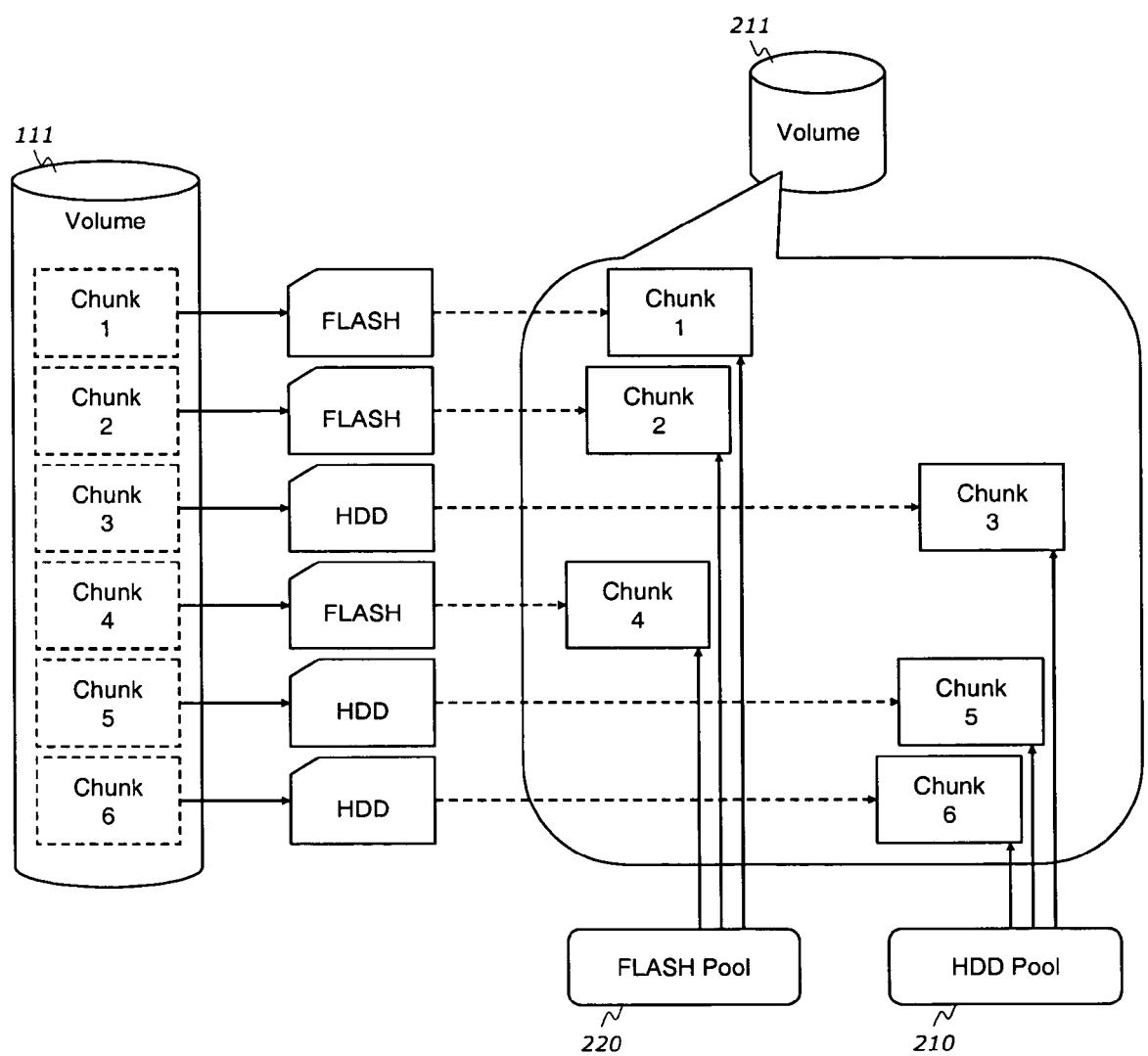
FIG. 6 illustrates an exemplary embodiment of a storage volume.

FIG. 6 illustrates an exemplary embodiment of a storage volume, which is divided into six chunks. As a result of log information analysis by the volume analysis program 526, a specific pool having a specific pool type (FLASH or HDD) is linked to each chunk. The volume allocation request program 523 sends a volume allocation request to the volume allocation program 263. This request specifies the desired pool type information. This information may be specified as an attribute associated with the allocation request. The pool attribute information includes an attribute indicative of either HDD pool or FLASH pool. In response to the received allocation requests, chunks are allocated in the storage apparatus 200. It is important to note that chunks are portions of storage volume and not volumes themselves. A volume is composed of several chunks.

In the shown example, after six chunks are allocated from the respective pools, the volume concatenation request program 524 sends a volume concatenation request to the volume concatenation program 264. The volume concatenation program 264 concatenates the six chunks together. The concatenation is performed in a specific order. As a result of the concatenation, volume 211 is created. The exemplary volume 211 shown in FIG. 6 is composed of three FLASH chunks and three HDD chunks.

Subsequently, the volume migration request program 525 sends a migration request to the data migration program 321. Pursuant to this request, the data stored in the volume 111 is migrated to the volume 211 by means of a block-by-block data copy operation.

Finally, the path alternation request program 527 in the management computer 500 sends a path alternation request to the access path management program 14 in the host computer 10. In response to the received request, the access path management program 14 switches the data access path from the volume 111 to the volume 211. The volume 211 is composed of HDD chunks and FLASH chunks, and is optimized according to data access pattern from the host computer 10. Therefore, the data access performance of the volume 211 is expected to be higher than of the volume 111.

Because the capacity of the FLASH media is limited, a priority system may be used in an embodiment of the invention to allocate chunks from the FLASH memory pool. The column "priority" in the mapping table 529 indicates the level of priority for allocating of FLASH memory. As would be appreciated by those of ordinary skill in the art, the capacity of FLASH memory units is limited. Moreover, the capacity of FLASH memory is often less than the capacity of the HDD units.

Figure 7:
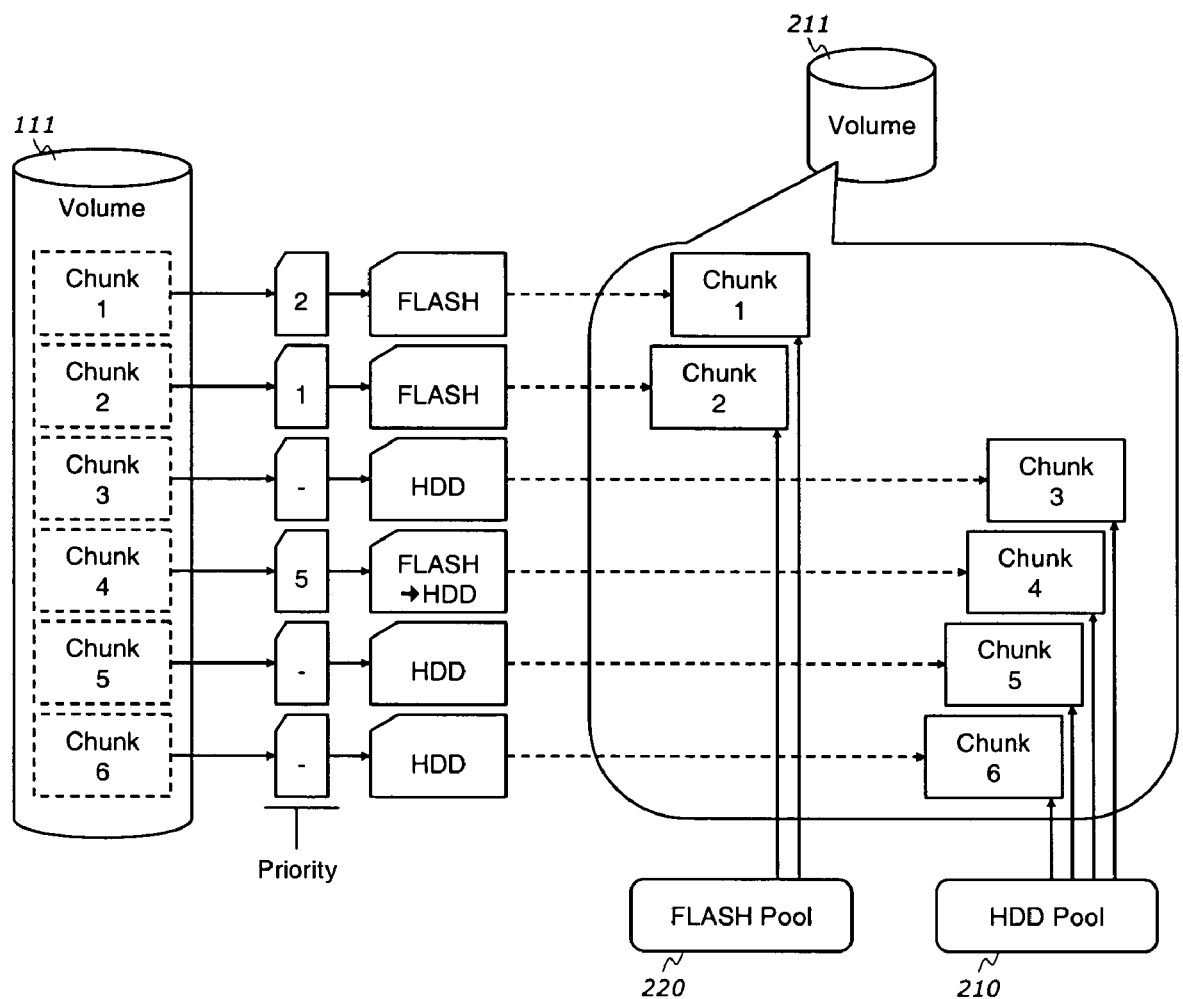
FIG. 7 illustrates storage volume allocation based on priority.

For example, when the capacity ratio of FLASH pools to HDD pools is 2:4, and the administrator directs the management computer 500 to preserve this ratio, then the aforesaid "priority" column is consulted upon allocation of volume chunks. FIG. 7 illustrates storage volume allocation based on priority of each chunk. To preserve the 2:4 allocation ratio, chunk #4 is allocated to the HDD pool as opposed to FLASH pool, because the priority of chunk #4 is lower than the priority of chunk #1 or #2. Thus, chunk #4 is allocated using the HDD pool.

Figure 8:
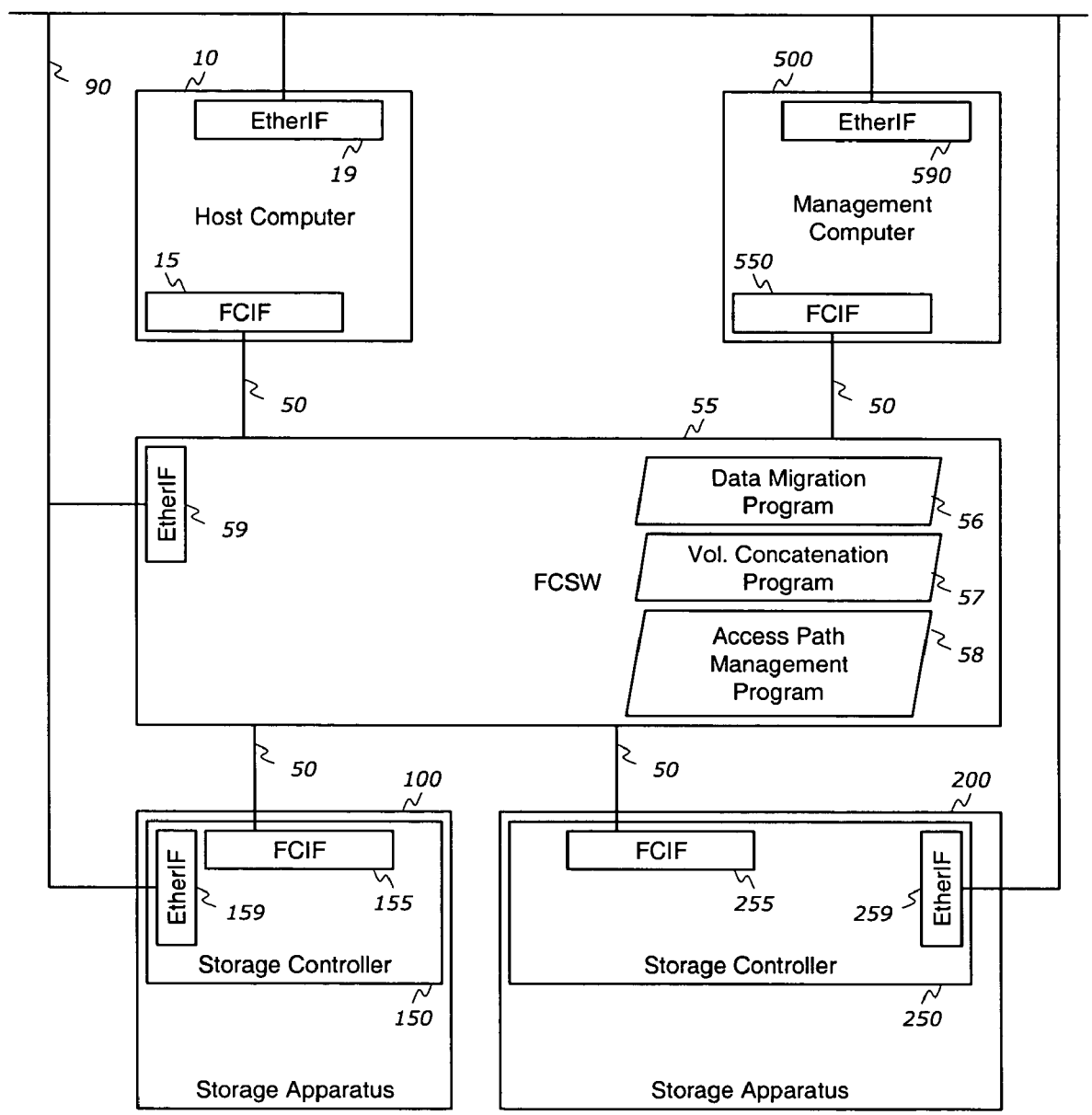
FIG. 8 shows an alternative exemplary embodiment of information system in accordance with the inventive concept

Certain alternative embodiments of the inventive system will now be described. FIG. 8 illustrates another exemplary information system embodying the inventive concept. In the embodiment shown in FIG. 8, the data migration module is implemented by means of a data migration program 56 executing on the FCSW 55. In addition, the volume concatenation program 57 and the access path management program 58 are also implemented using the FCSW 55. EtherIF 59 is added for enabling communication with the management computer 300. All other elements of the system shown in FIG. 8 are generally equivalent to the corresponding elements of the system shown in FIG. 1 and described in detail hereinabove.

Figure 9:
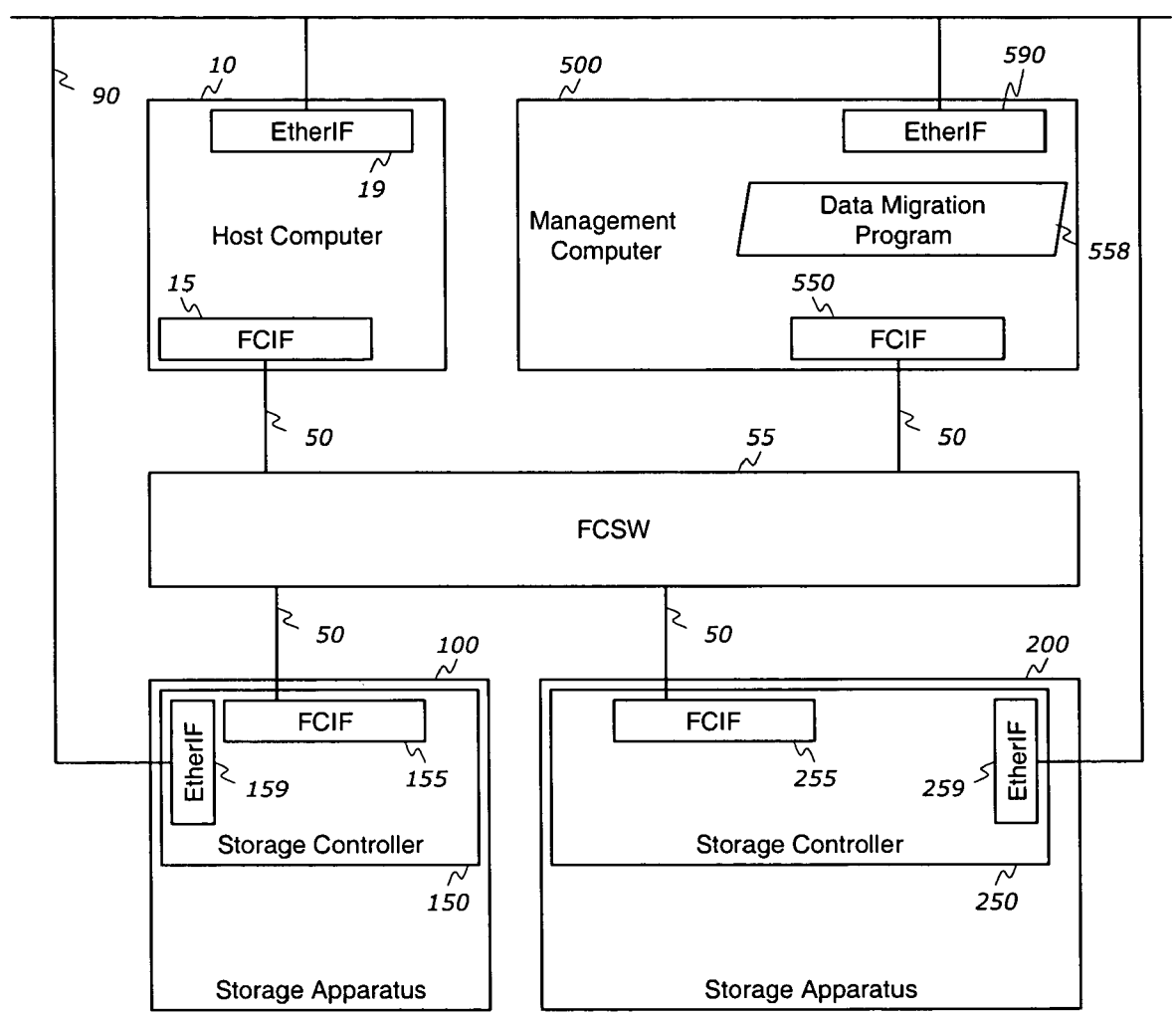
FIG. 9 shows another alternative exemplary embodiment of information system in accordance with the inventive concept

FIG. 9 shows an alternative exemplary embodiment of information system in accordance with the inventive concept. In the exemplary system shown in FIG. 9, the data migration module is implemented as a data migration program 558 executing on the management computer 500. All other elements of the system shown in FIG. 9 are generally equivalent to the corresponding elements of the system shown in FIG. 1 and described in detail hereinabove.

Figure 10:
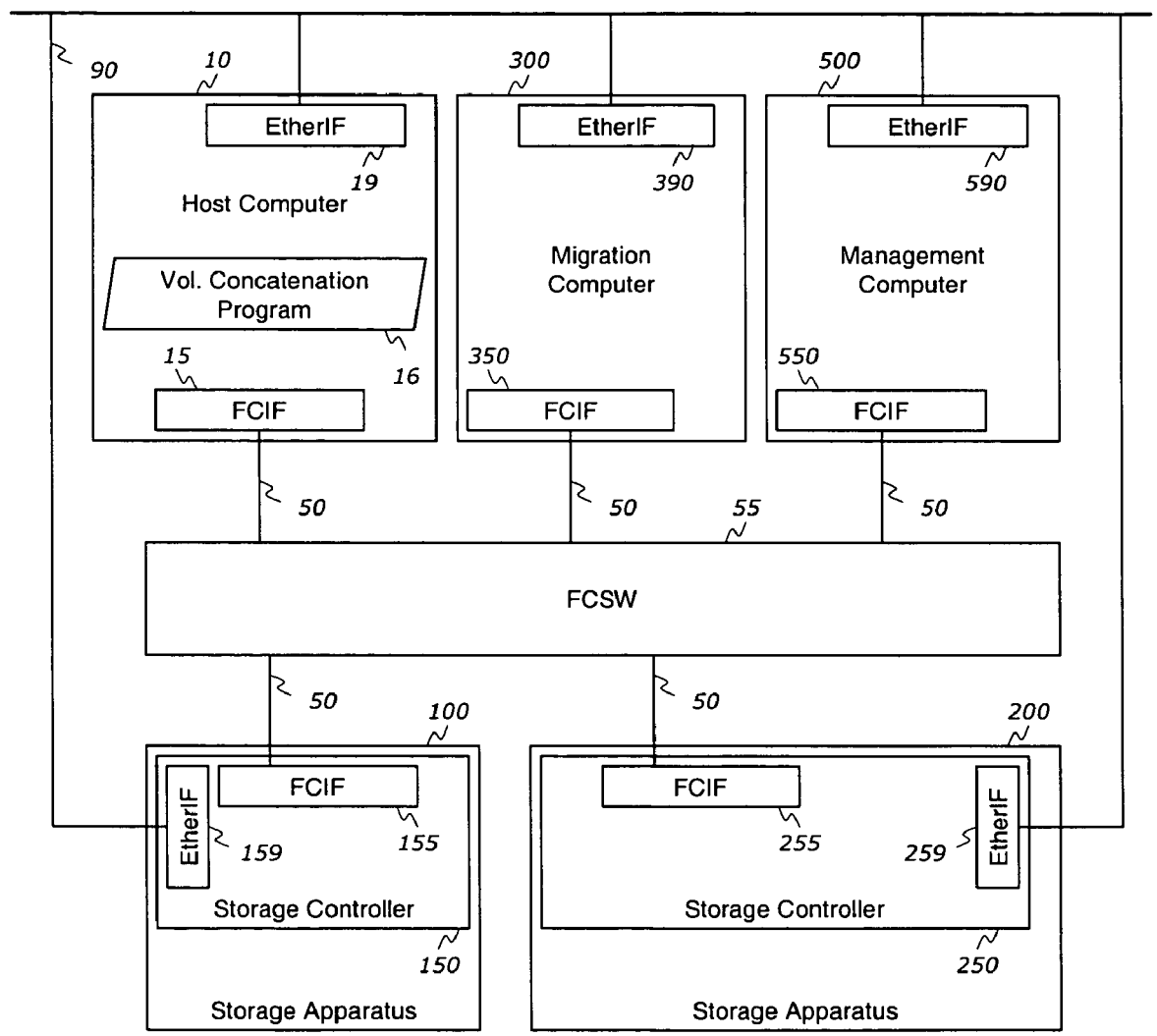
FIG. 10 shows yet another alternative exemplary embodiment of information system in accordance with the inventive concept.

FIG. 10 shows another alternative exemplary embodiment of information system in accordance with the inventive concept. In the system shown in FIG. 10, a volume concatenation program 16 is deployed in the host computer 10. All other elements of the system shown in FIG. 10 are generally equivalent to the corresponding elements of the system shown in FIG. 1 and described in detail hereinabove.

Figure 11:
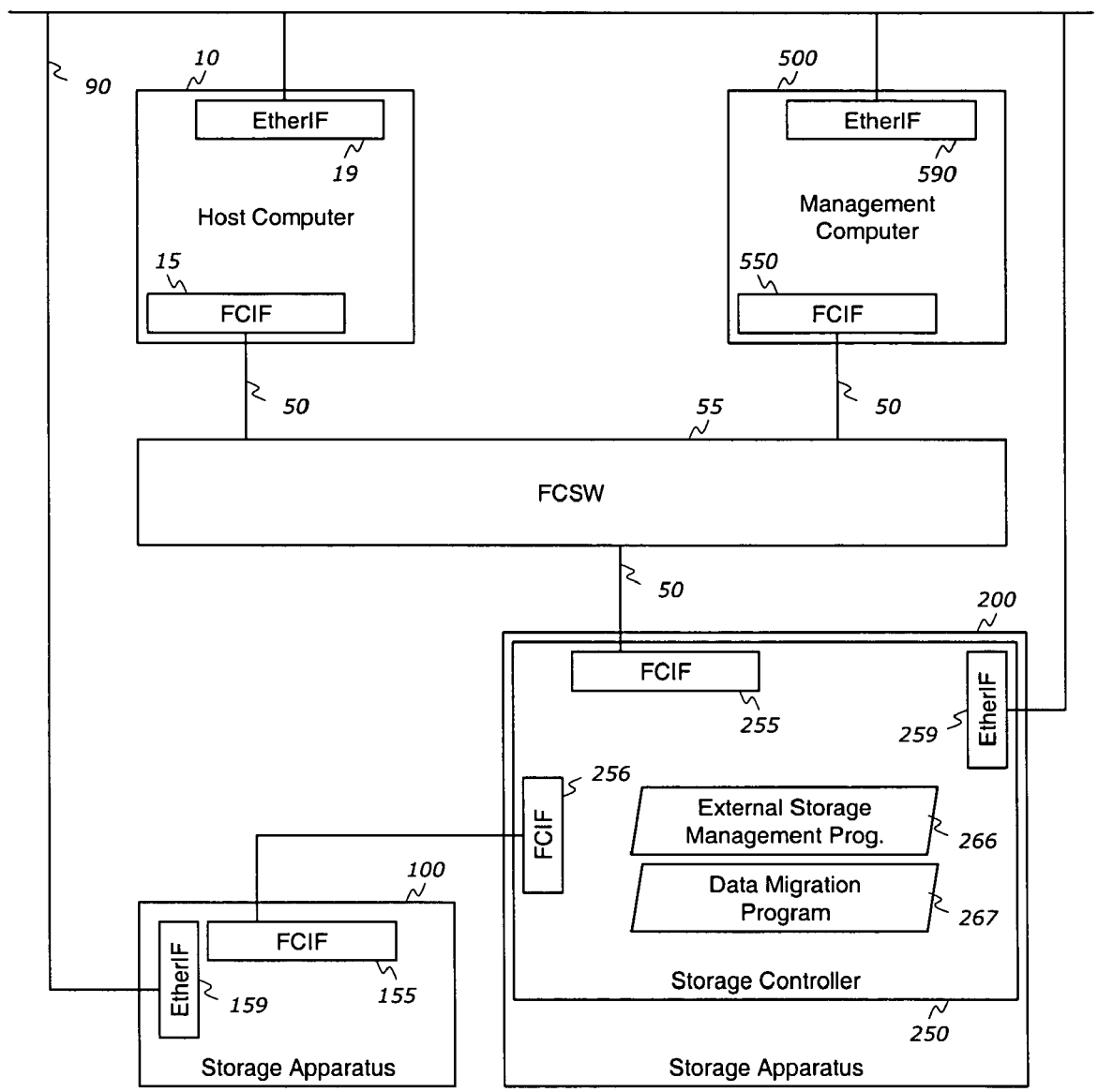
FIG. 11 shows a further alternative exemplary embodiment of information system in accordance with the inventive concept.

FIG. 11 shows yet another alternative exemplary embodiment of information system in accordance with the inventive concept. In the system shown in FIG. 10, the storage apparatus 100 is connected to the storage apparatus 200. An external storage management program 266 and an additional FCIF 256 for external storage are deployed. The data migration module is implemented using a data migration program 267 executing in the storage apparatus 200. All other elements of the system shown in FIG. 11 are generally equivalent to the corresponding elements of the system shown in FIG. 1 and described in detail hereinabove.

Figure 12:
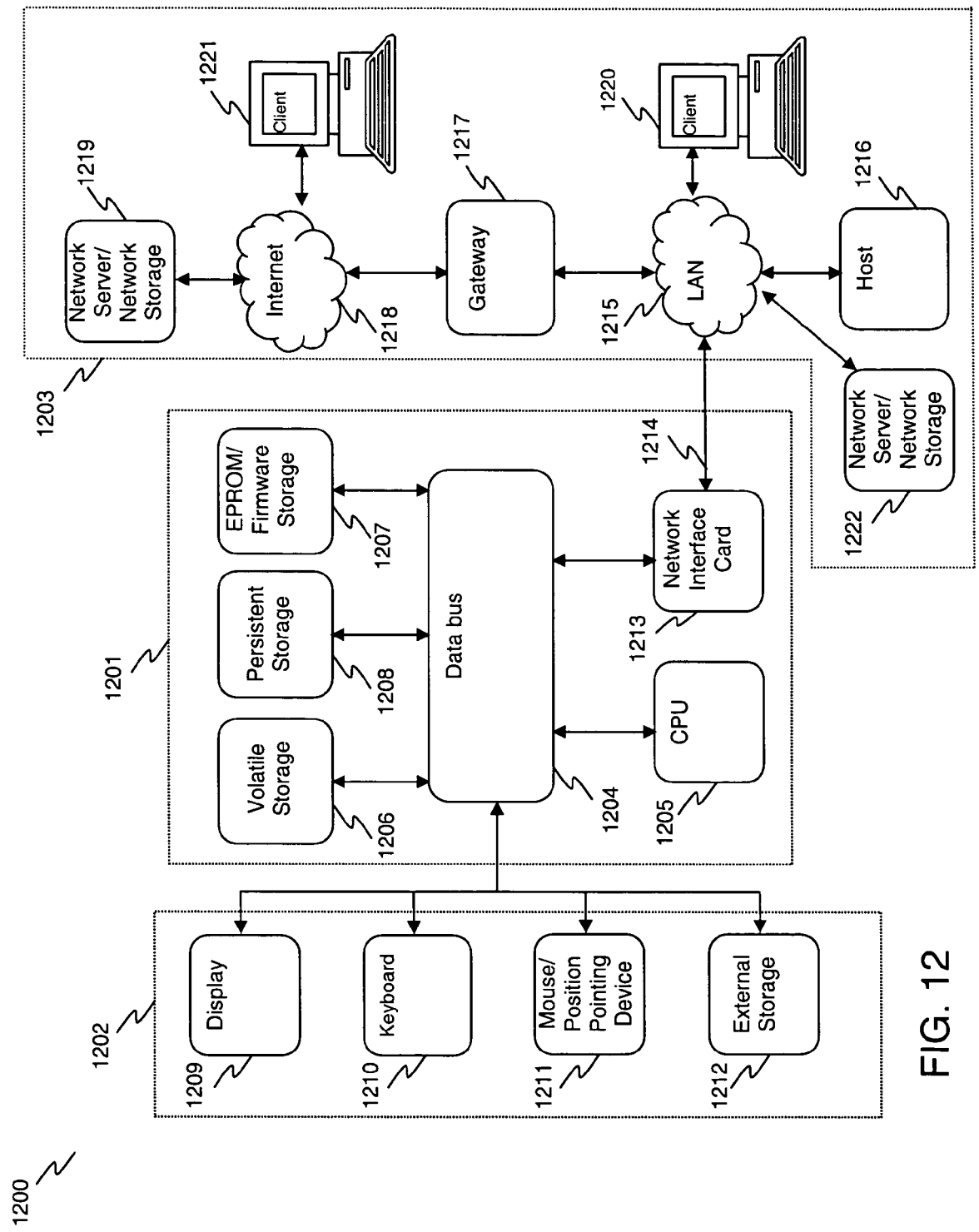
FIG. 12 illustrates an exemplary embodiment of a computer platform upon which the inventive system may be implemented.

FIG. 12 is a block diagram that illustrates an embodiment of a computer/server system 1200 upon which an embodiment of the inventive methodology may be implemented. The system 1200 includes a computer/server platform 1201, peripheral devices 1202 and network resources 1203.

The computer platform 1201 may include a data bus 1204 or other communication mechanism for communicating information across and among various parts of the computer platform 1201, and a processor 1205 coupled with a data bus 1204 for processing information and performing other computational and control tasks. Computer platform 1201 also includes a volatile storage 1206, such as a random access memory (RAM) or other dynamic storage device, coupled to bus 1204 for storing various information as well as instructions to be executed by processor 1205. The volatile storage 1206 also may be used for storing temporary variables or other intermediate information during execution of instructions by processor 1205. Computer platform 1201 may further include a read only memory (ROM or EPROM) 1207 or other static storage device coupled to bus 1204 for storing static information and instructions for processor 1205, such as basic input-output system (BIOS), as well as various system configuration parameters. A persistent storage device 1208, such as a magnetic disk, optical disk, or solid-state flash memory device is provided and coupled to bus 1204 for storing information and instructions.

Computer platform 1201 may be coupled via bus 1204 to a display 1209, such as a cathode ray tube (CRT), plasma display, or a liquid crystal display (LCD), for displaying information to a system administrator or user of the computer platform 1201. An input device 1210, including alphanumeric and other keys, is coupled to bus 1204 for communicating information and command selections to processor 1205. Another type of user input device is cursor control device 1211, such as a mouse, a trackball, or cursor direction keys for communicating direction information and command selections to processor 1204 and for controlling cursor movement on display 1209. This input device typically has two degrees of freedom in two axes, a first axis (e.g., x) and a second axis (e.g., y), that allows the device to specify positions in a plane.

An external storage device 1212 may be connected to the computer platform 1201 via bus 1204 to provide an extra or removable storage capacity for the computer platform 1201. In an embodiment of the computer system 1200, the external removable storage device 1212 may be used to facilitate exchange of data with other computer systems.

The invention is related to the use of computer system 1200 for implementing the techniques described herein. In an embodiment, the inventive system may reside on a machine such as computer platform 1201. According to one embodiment of the invention, the techniques described herein are performed by computer system 1200 in response to processor 1205 executing one or more sequences of one or more instructions contained in the volatile memory 1206. Such instructions may be read into volatile memory 1206 from another computer-readable medium, such as persistent storage device 1208. Execution of the sequences of instructions contained in the volatile memory 1206 causes processor 1205 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1205 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1208. Volatile media includes dynamic memory, such as volatile storage 1206. Transmission media includes coaxial cables, copper wire and fiber optics, including the wires that comprise data bus 1204.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1205 for execution. For example, the instructions may initially be carried on a magnetic disk from a remote computer. Alternatively, a remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on the data bus 1204. The bus 1204 carries the data to the volatile storage 1206, from which processor 1205 retrieves and executes the instructions. The instructions received by the volatile memory 1206 may optionally be stored on persistent storage device 1208 either before or after execution by processor 1205. The instructions may also be downloaded into the computer platform 1201 via Internet using a variety of network data communication protocols well known in the art.

The computer platform 1201 also includes a communication interface, such as network interface card 1213 coupled to the data bus 1204. Communication interface 1213 provides a two-way data communication coupling to a network link 1214 that is connected to a local network 1215. For example, communication interface 1213 may be an integrated services digital network (ISDN) card or a modem to provide a data communication connection to a corresponding type of telephone line. As another example, communication interface 1213 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1213 sends and receives electrical, electromagnetic or optical signals that carry digital data streams representing various types of information.

Network link 1213 typically provides data communication through one or more networks to other network resources. For example, network link 1214 may provide a connection through local network 1215 to a host computer 1216, or a network storage/server 1222. Additionally or alternatively, the network link 1213 may connect through gateway/firewall 1217 to the wide-area or global network 1218, such as an Internet. Thus, the computer platform 1201 can access network resources located anywhere on the Internet 1218, such as a remote network storage/server 1219. On the other hand, the computer platform 1201 may also be accessed by clients located anywhere on the local area network 1215 and/or the Internet 1218. The network clients 1220 and 1221 may themselves be implemented based on the computer platform similar to the platform 1201.

Local network 1215 and the Internet 1218 both use electrical, electromagnetic or optical signals that carry digital data streams. The signals through the various networks and the signals on network link 1214 and through communication interface 1213, which carry the digital data to and from computer platform 1201, are exemplary forms of carrier waves transporting the information.

Computer platform 1201 can send messages and receive data, including program code, through the variety of network(s) including Internet 1218 and local network 1215, network link 1214 and communication interface 1213. In the Internet example, when the system 1201 acts as a network server, it might transmit a requested code or data for an application program running on client(s) 1220 and/or 1221 through Internet 1218, gateway/firewall 1217, local network 1215 and communication interface 1213. Similarly, it may receive code from other network resources.

The received code may be executed by processor 1205 as it is received, and/or stored in persistent or volatile storage devices 1208 and 1206, respectively, or other non-volatile storage for later execution. In this manner, computer system 1201 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system. It is intended that the specification and examples be considered as exemplary only, with a true scope and spirit of the invention being indicated by the following claims.

What is claimed is:

1. A computerized data storage system comprising:
    a first storage device comprising a first storage volume storing data;
    a host computer operatively coupled to a first storage system via a network and accesses the data in accordance with a data access pattern; and
    a second storage device coupled to the first storage device and comprising a storage controller, a first media pool and a second media pool,
    wherein characteristics of the first media pool are different from characteristics of the second media pool;
    wherein the second storage device determines the data access pattern and allocates a second storage volume comprising at least a portion of the first media pool and at least a portion of the second media pool in accordance with the determined data access pattern; and
    wherein upon execution of a data migration operation, the allocated second storage volume stores a copy of the data; and,
    wherein the first and second storage volumes comprise chunks with each chunk linked to a respective media pool.

2. The computerized data storage system of claim 1, wherein the first media pool is a hard disk drive pool and the second media pool is a FLASH media pool.

3. The computerized data storage system of claim 1, wherein the second storage volume comprises a migration module operable to initiate the data migration operation causing the data to be migrated from the first storage volume of the first storage device to the second storage volume of the second storage device.

4. The computerized data storage system of claim 1, further comprising a management module operable to initiate the data migration operation causing the data to be migrated from the first storage volume of the first storage device to the second storage volume of the second storage device.

5. The computerized data storage system of claim 1, wherein the second volume comprises at least one FLASH memory chunk and at least one hard disk drive chunk.

6. The computerized data storage system of claim 1, wherein the data access pattern indicated whether data access is random or sequential.

7. The computerized data storage system of claim 1, wherein the data access pattern comprises data write to data read ratio.

8. The computerized data storage system of claim 1, wherein the data access pattern comprises data access frequency.

9. The computerized data storage system of claim 1, wherein the data access pattern comprises no access duration.

10. The computerized data storage system of claim 1, further comprising log storage unit operable to store information descriptive of the access pattern of the data by the host computer, wherein the second storage device is operable to determine the data access pattern based on the contents of the log storage unit.

11. The computerized data storage system of claim 1, wherein the each of the first and second storage devices further comprises a lifetime reporting module operable to determine a remaining lifetime of storage units within at least one of the first media pool and the second media pool.

12. The computerized data storage system of claim 1, wherein the second storage device further comprises a volume concatenation module operable to concatenate the at least a portion of a first media pool and the at least a portion of the second media pool into the second storage volume.

13. The computerized data storage system of claim 1, wherein the host computer comprises an access path management module, operable to manage access of the host computer to the first storage device and the second storage device.

14. The computerized data storage system of claim 1, further comprising a memory module storing a mapping table comprising specifying a type of media pool corresponding to the access pattern.

15. The computerized data storage system of claim 1, wherein the at least a portion of a first media pool and the at least a portion of the second media pool are allocated to the second storage volume based on priority and wherein the priority is determined based on the data access pattern.

16. The computerized data storage system of claim 1, further comprising a network switch operatively coupled to the first storage device, the second storage device and the host computer, the network switch comprising a migration module operable to cause the data to be migrated from the first storage volume of the first storage device to the second storage volume of the second storage device.

17. The computerized data storage system of claim 16, wherein the network switch further comprises a volume concatenation module operable to concatenate the at least a portion of a first media pool and the at least a portion of the second media pool into the second storage volume.

18. The computerized data storage system of claim 16, wherein the network switch further comprises an access path management module, operable to manage access of the host computer to the first storage device and the second storage device.

19. The computerized data storage system of claim 1, further comprising a network switch, wherein the first storage device is coupled to the second storage via the network switch.

20. The computerized data storage system of claim 19, wherein the network switch is operable to initiate the data migration operation.

21. The computerized data storage system of claim 19, wherein the network switch is a Fibre Channel switch.

22. The computerized data storage system of claim 1, wherein the first storage device is directly coupled to the second storage.

23. The computerized data storage system of claim 1, wherein the data migration operation is initiated by the second storage device.

24. A method comprising:
   logging access requests directed to a data stored in a first storage volume to produce a log information;
   analyzing the log information to determine a data access pattern;
   allocating a second storage volume comprising at least one block of data of a first media pool and at least one block of data of a second media pool in accordance with the determined data access pattern, characteristics of the first media pool being different from characteristics of the second media pool; and
   migrating the data from the first storage volume to the second storage volume; and
   wherein the first and second storage volumes comprise chunks with each chunk linked to a respective media pool.

25. The method of claim 24, wherein the first media pool is a hard disk drive pool and the second media pool is a FLASH media pool.

26. The method of claim 24, wherein the data access pattern indicated whether data access is random or sequential.

27. The method of claim 24, wherein the data access pattern comprises data write to data read ratio.

28. The method of claim 24, wherein the data access pattern comprises data access frequency.

29. The method of claim 24, wherein the data access pattern comprises no access duration.

30. A computer programming product embodied in a tangible storage medium, the computer programming product comprising:
   code for logging access requests directed to a data stored in a first storage volume to produce a log information;
   code for analyzing the log information to determine a data access pattern;
   code for allocating a second storage volume comprising at least one block of data of a first media pool and at least one block of data of a second media pool in accordance with the determined data access pattern, characteristics of the first media pool being different from characteristics of the second media pool, wherein the first and second storage volumes comprise chunks with each chunk linked to a respective media pool; and
   code for migrating the data from the first storage volume to the second storage volume.

31. The computer programming product of claim 30, wherein the first media pool is a hard disk drive pool and the second media pool is a FLASH media pool.

32. The computer programming product of claim 30, wherein the data access pattern indicated whether data access is random or sequential.

33. The computer programming product of claim 30, wherein the data access pattern comprises data write to data read ratio.

34. The computer programming product of claim 30, wherein the data access pattern comprises data access frequency.

35. The computer programming product of claim 30, wherein the data access pattern comprises no access duration.

* * * * *